Nov. 16, 1926.  1,607,340

A. CROST ET AL

TIRE SPREAD HOLDER

Filed Jan. 30, 1926

INVENTORS
Albert Crost
Hugh T. Hughes
By Hull Brock & West
Attys.

Patented Nov. 16, 1926.

1,607,340

UNITED STATES PATENT OFFICE.

ALBERT CROST AND HUGH T. HUGHES, OF CLEVELAND, OHIO.

TIRE SPREAD HOLDER.

Application filed January 30, 1926. Serial No. 84,800.

This invention relates to tire tools or spread holders for the casings of pneumatic tires, and the primary object of the invention is to provide a tool that is particularly adapted for holding a tire casing open or spread in order to facilitate the inspection of the interior and also to facilitate cleaning or repair of the tire.

Another object of our invention is to provide a tool of the character described which is simple and rigid in construction, easily assembled and disassembled, and which comprises few parts and is well adapted for quantity production at comparatively low cost.

Another object of our invention is to provide a tool of the class described which is adjustable for different sized casings and which will therefore eliminate the necessity for the garage man keeping on hand many different sizes of spread holders.

Figure 1:
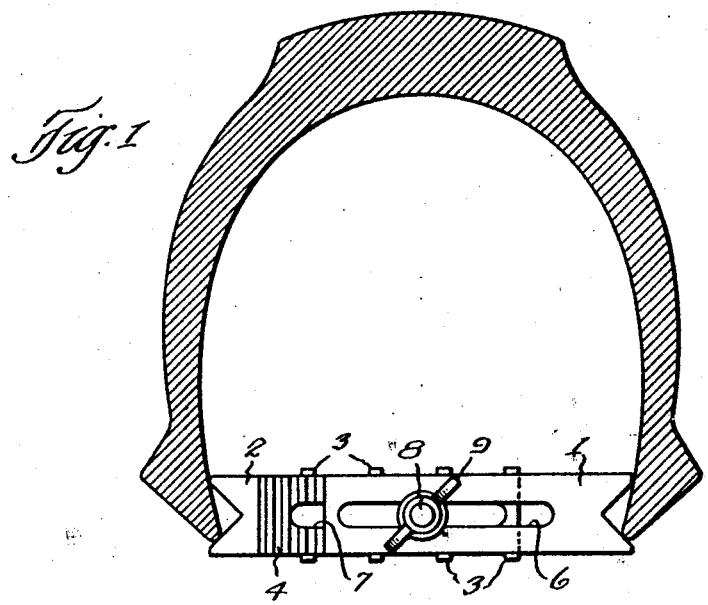
Figure 2:
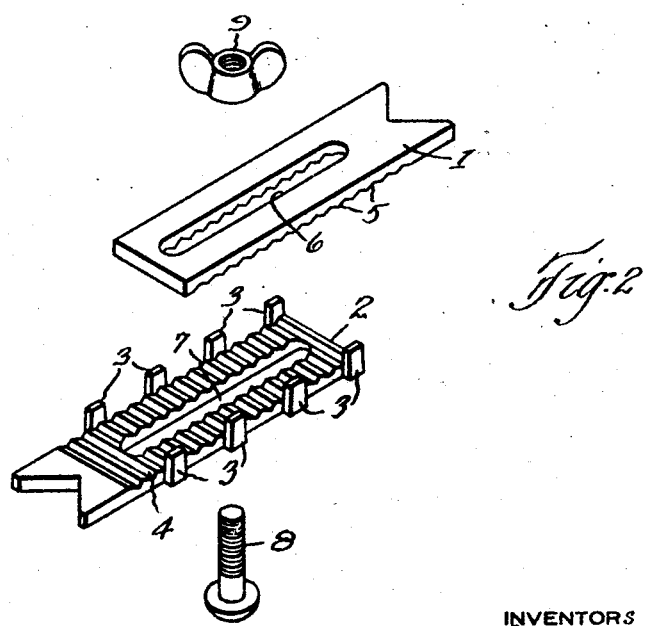

Other and more limited objects of our invention will appear as the description proceeds, reference being had to the accompanying drawing in which Fig. 1 is a sectional view of a tire casing with our improved holder inserted therein and Fig. 2 is a perspective view of the several parts disassembled.

Referring more particularly to the accompanying drawings it will be seen that the device comprises an upper plate 1 and a lower plate 2 each having a V-shaped notch in one end thereof. The lower plate 2 has a plurality of upstanding lugs 3 on each side thereof as shown in Fig. 2, and the upper side thereof is provided with corrugations 4 which cooperate with similar corrugations 5 on the underside of the plate 1 as will hereinafter appear. The plates 1 and 2 are identical except for the lugs 3 on the lower plate and the plate 1 fits over the plate 2 between the lugs 3 as shown in Fig. 1. The plate 1 is provided with a longitudinally extending centrally disposed slot 6; and the plate 2 is provided with a similarly disposed slot 7. When the plates are placed one over the other as shown the slots 6 and 7 coincide. A bolt 8 extends through the slots 6 and 7 and is adapted to receive a wing nut 9 which is adapted to be tightened to rigidly secure the plates together, the grooves 4 and 5 interlocking with each other for the purpose of preventing any relative movement between the two plates. If desired suitable calibrations may be provided on the plates 1 and 2 whereby the tool may be readily set for the size desired depending on the size of the tire with which the device is to be used.

This device results in a big saving to garage men and the repair shops where heretofore it has been necessary to provide a number of different size spread holders for different size tires. In vulcanizing repair jobs there are always two and sometimes three or four of these tools used in each tire and the tools remain in the tire until the process is completed which requires considerable time and as different size tires require different size spread holders the utility and advantages of our device can be readily appreciated.

It will now be clear that we have provided a device which will accomplish the objects of the invention as hereinbefore stated.

Having thus described our invention, what we claim is:—

1. A tire spread holder comprising a pair of plates each having a V-shaped notch in one end thereof, each plate being also provided with a longitudinally extending slot therein, said slots adapted to coincide when said plates are placed one over the other, a plurality of upstanding lugs on opposite sides of one of said plates, a bolt for securing said plates together extending through said slots and adapted to receive a wing nut whereby one plate may be adjustably secured to the other.

2. A tire spread holder comprising a pair of plates each having a V-shaped notch in one end thereof, each plate being also provided with a longitudinally extending slot therein, said slots adapted to coincide when said plates are placed one over the other, a plurality of upstanding lugs on opposite sides of one of said plates, a bolt for securing said plates together extending through said slots and adapted to receive a wing nut whereby one plate may be adjustably secured to the other, the adjacent sides of said plates being corrugated.

3. An adjustable spread holder for tire casings comprising a pair of plates, each plate having a V-shaped notch in one end thereof and being also provided with a longitudinally extending slot, said slots adapted to coincide when said plates are placed one over the other, the adjacent faces of said plates being corrugated, and a plurality of upstanding lugs on opposite sides of one of said plates, a bolt extending through said slots and adapted to receive a wing nut whereby said plates may be adjustably secured together in different relative positions.

4. An adjustable spread holder for tire casings comprising a pair of plates, one of said plates having flanges on the opposite sides thereof, each of said plates having an opening therein, said openings adapted to coincide when said plates are placed one over the other, and means extending through said openings adapted to frictionally secure said plates together, the adjacent surfaces of said plates having laterally extending corrugations thereon.

In testimony whereof, we hereunto affix our signatures.

ALBERT CROST.
HUGH T. HUGHES.